United States Patent
Sundstrom et al.

(10) Patent No.: US 9,473,294 B2
(45) Date of Patent: Oct. 18, 2016

(54) RADIO TRANSCEIVER HAVING FREQUENCY SYNTHESIZER

(71) Applicant: Telefonaktiebolaget L M Ericsson (publ), Stockholm (SE)

(72) Inventors: Lars Sundstrom, Sodra Sandby (SE); Anders Wallen, Ystad (SE); Henrik Sjoland, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/433,020

(22) PCT Filed: Oct. 2, 2013

(86) PCT No.: PCT/EP2013/070562
§ 371 (c)(1),
(2) Date: Apr. 1, 2015

(87) PCT Pub. No.: WO2014/053556
PCT Pub. Date: Apr. 10, 2014

(65) Prior Publication Data
US 2015/0249534 A1    Sep. 3, 2015

Related U.S. Application Data

(60) Provisional application No. 61/711,933, filed on Oct. 10, 2012.

(30) Foreign Application Priority Data

Oct. 5, 2012 (EP) .................................... 12187418

(51) Int. Cl.
*H04B 1/401* (2015.01)
*H04L 7/033* (2006.01)
*H04B 1/00* (2006.01)
*H04B 1/403* (2015.01)
*H04W 88/06* (2009.01)

(52) U.S. Cl.
CPC ............ *H04L 7/0331* (2013.01); *H04B 1/0067* (2013.01); *H04B 1/401* (2013.01); *H04B 1/406* (2013.01); *H04W 88/06* (2013.01)

(58) Field of Classification Search
CPC .............................. H04B 1/403; H04B 1/401
USPC ..................................... 455/67.11, 73, 77, 86
See application file for complete search history.

(56) References Cited

U.S. PATENT DOCUMENTS

| | | | |
|---|---|---|---|
| 6,118,314 A * | 9/2000 | Arnould | G06F 1/10 327/141 |
| 6,201,952 B1 * | 3/2001 | Shimizu et al. | 455/180.1 |

(Continued)

FOREIGN PATENT DOCUMENTS

| EP | 0 893 887 A2 | 1/1999 |
|---|---|---|
| EP | 1 786 113 A2 | 5/2007 |

OTHER PUBLICATIONS

PCT International Search Report, mailed Dec. 9, 2013, in connection with International Application No. PCT/EP2013/070562, all pages.

(Continued)

*Primary Examiner* — Tuan H Nguyen
(74) *Attorney, Agent, or Firm* — Leffler Intellectual Property Law, PLLC

(57) ABSTRACT

A radio transceiver is disclosed. It comprises a first transceiver circuit and a second transceiver circuit, the latter requiring an LO signal having higher LO frequency than the former. It further comprises a frequency synthesizer comprising a first clock-signal generator adapted to generate the LO signal for the first transceiver circuit based on a first reference oscillation signal and a second clock-signal generator adapted to generate the LO signal for the second transceiver circuit based on a second reference oscillation signal, which is or is derived from the LO signal for the first transceiver circuit. A radio communication apparatus comprising the radio transceiver is also disclosed.

18 Claims, 2 Drawing Sheets

(56) References Cited

U.S. PATENT DOCUMENTS

2006/0057995 A1 3/2006 Chien
2011/0217934 A1* 9/2011 Oga ............................. 455/62

OTHER PUBLICATIONS

PCT Written Opinion, mailed Dec. 9, 2013, in connection with International Application No. PCT/EP2013/070562, all pages.

* cited by examiner

RADIO TRANSCEIVER HAVING FREQUENCY SYNTHESIZER

CROSS-REFERENCE TO RELATED APPLCATIONS

This application claims priority under 35 U.S.C. §119 to European Patent Application No. 12187418.4, filed Oct. 5, 2012, which is hereby incorporated herein by reference in its entirety. This application also claims the benefit of U.S. Provisional Application No. 61/711,933, filed Oct. 10, 2012, which is hereby incorporated herein by reference in its entirety.

TECHNICAL FIELD

The present invention relates to generation of local oscillator signals in a radio transceiver.

BACKGROUND

Cellular communication systems are becoming increasingly more important. In such cellular communication systems, a user equipment (UE), such as a mobile phone or cellular computer modem, connects wirelessly to the network via base stations (BSs), that in turn are connected to a backhaul network for forwarding the communication from the user equipment.

UEs are normally equipped with transceiver circuitry for accessing cellular networks of different kinds using different radio access technologies (RATs). Examples of such RATs include GSM (Global System for Mobile communications), WCDMA (Wideband Code Division Multiple Access), and 3GPP (3rd Generation Partnership Project) Long Term Evolution (LTE) system, in the following referred to simply as "LTE". Such cellular RATs typically operate in various frequency bands in the range 0.5-5 GHz. In addition to the cellular RATs, UEs may also be equipped with transceiver circuitry for other types of RATs, such as Bluetooth, wireless local area networks (WLAN), near field communication (NFC), etc. Some emerging RATs, such as IEEE 802.11ad and WirelessHD, may operate in frequency bands that are located at significantly higher frequencies than e.g. the 0.5-5 GHz mentioned above, such as in the 60 GHz band.

For a UE with multiple RAT capability, there is a need to generate a multitude of local oscillator (LO) signals for transceivers of the different RATs. Furthermore, the range of LO frequencies that need to be generated may be relatively wide. Thus, there is a need for efficient frequency synthesizer circuitry for radio transceivers.

SUMMARY

An object of the present invention is to provide for generation of local oscillator (LO) signals in a radio transceiver.

According to a first aspect, there is provided a radio transceiver. The radio transceiver comprises a first transceiver circuit, requiring a first LO signal having a first LO frequency. Furthermore, the radio transceiver comprises a second transceiver circuit requiring a second LO signal having a second LO frequency, which is higher than the first LO frequency. Moreover, the radio transceiver comprises a frequency synthesizer. The frequency synthesizer comprises a reference input port for receiving a first reference oscillation signal from a reference oscillator. Furthermore, the frequency synthesizer comprises a first clock-signal generator adapted to generate the first LO signal based on the first reference oscillation signal. Moreover, the frequency synthesizer comprises a second clock-signal generator adapted to generate the second LO signal based on a second reference oscillation signal. The second reference oscillation signal is or is derived from the first LO signal.

The first LO frequency may be in the range 0.5-5 GHz.

The second LO frequency may be higher than or equal to 10 GHz.

The second LO frequency may be at least a factor 5 higher than the first LO frequency.

The first LO signal may be an LO signal for a transmitter of the first transceiver circuit.

In some embodiments, one or both of the first and the second clock-signal generator is or comprises a phase-locked loop (PLL).

The radio transceiver may comprise a control unit adapted to detect a change of the first LO frequency. The control unit may be adapted to, in response to detecting said change of said first LO frequency, adjust a setting of the second clock-signal generator to maintain the second LO signal at the second LO frequency. The control unit may be adapted to, in response to detecting said change of said first LO frequency, indicate said change to the second transceiver circuit. The second transceiver circuit may be adapted to, in response to receiving an indication from the control unit that the first LO frequency has changed, discard a received signal segment affected by said change of the first LO frequency.

The frequency synthesizer may comprise a third clock-signal generator adapted to temporarily generate the second reference oscillation signal during a change of the first LO frequency.

The first transceiver circuit may be a transceiver circuit for a first radio access technology (RAT). The first RAT may e.g. be a cellular RAT, such as but not limited to a Global System for Mobile Communications (GSM), a Wideband Code-Division Multiple Access (WCDMA), or a 3GPP Long Term Evolution (LTE) RAT.

The second transceiver circuit may also be a transceiver for the first RAT, but operating at higher frequencies than the first transceiver circuit. Alternatively, the second transceiver circuit may be a transceiver circuit for a second RAT. The second RAT may e.g. be, but is not limited to, IEEE 802.11ad, WirelessHD, WiGig, ECMA-387, or a direct device-to-device RAT.

According to a second aspect, there is provided a radio communication apparatus comprising the radio transceiver according to the first aspect. The radio communication apparatus may e.g. be, but is not limited to, a user equipment for a cellular communication system.

Further embodiments are defined in the dependent claims. It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
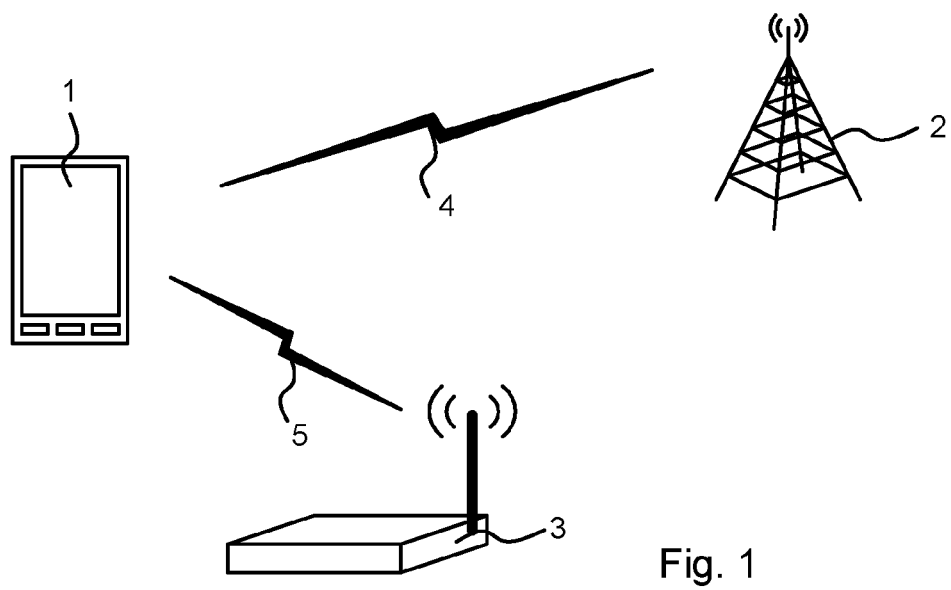
FIG. 1 schematically illustrates a user equipment in communication with network nodes.

FIG. 1 illustrates schematically an environment where embodiments of the present invention may be employed. A UE 1 of a cellular communication system is in wireless communication with a network node 2, such as a base station or the like, of the cellular communication system via a wireless link 4 using a first RAT, which may be a cellular RAT. The cellular RAT may e.g. be, but is not limited to, GSM, WCDMA, or LTE. In addition, in FIG. 1, the UE 1 is in wireless communication with a network node 3, such as an access point or the like, of a second RAT. The second RAT may e.g. be, but is not limited to, IEEE 802.11ad, WirelessHD, WiGig or ECMA-387. In examples and embodiments described herein, it is assumed that signals of the second RAT are transmitted in radio frequency (RF) frequency bands that are significantly higher in frequency than the RF frequency bands used for signal transmission in the first RAT.

For each RAT, one or more corresponding LO signals have to be generated for upconversion of signals to be transmitted and downconversion of received signals. The frequency of such LO signals, in the following referred to as LO frequencies, are for the cellular RATs typically about the same as the center frequencies of the corresponding RF frequency bands used by the RATs. For the second RAT the LO frequency is typically about the same as the RF frequency, or a fraction of the RF frequency, e.g. one third. LO signal generation for a cellular RAT, where the LO frequencies may e.g. lie in the range 0.5-5 GHz, can normally be performed using a phase-locked loop having a crystal oscillator generating a reference oscillation signal. However, the inventors have realized that for the generation of LO signals with higher LO frequencies, say in the order of 60 GHz, such a solution with a PLL driven by a crystal oscillator is not as viable as solution due to problems with phase-noise widening. The inventors have realized that, to mitigate the phase noise problem, PLLs for generating such LO signals with such higher LO frequencies can use reference oscillation signals with higher frequencies than can normally be generated using a crystal oscillator, which allows for higher PLL loop bandwidth. According to embodiments of the present invention, this is solved by using an LO signal generated by a clock-signal generator for the first RAT as a reference oscillation signal for a clock signal generator for the second RAT. Thereby, a higher frequency reference oscillation signal can be obtained for the clock-signal generator for the second RAT than would normally be obtainable using a crystal oscillator.

Figure 2:
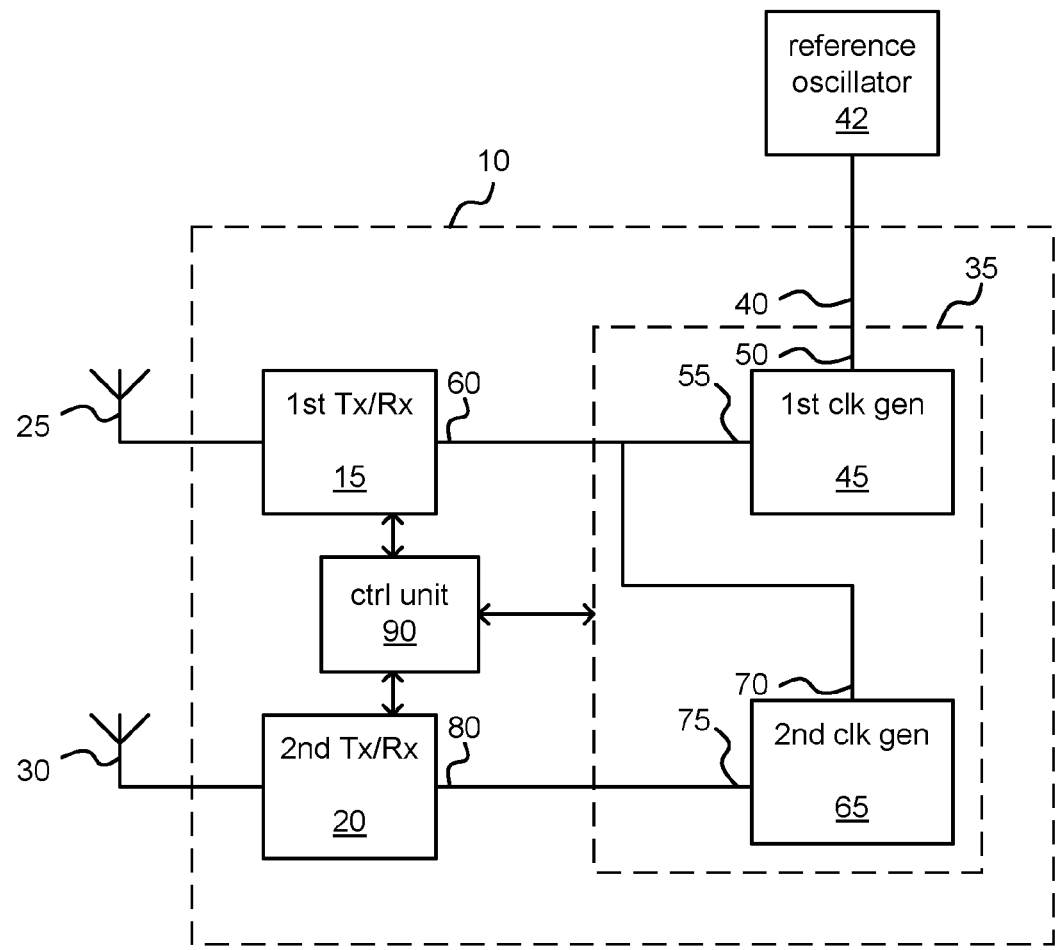
FIGS. 2-3 are block diagrams of a radio transceiver according to embodiments of the present invention.

FIG. 2 is a block diagram of a (multi RAT) radio transceiver 10 according to some embodiments of the present invention. The radio transceiver 10 may e.g. be used in the UE 1 (FIG. 1). In FIG. 2, the radio transceiver 10 comprises a first transceiver circuit 15 for the first RAT. The first transceiver 15 requires (at least) a first LO signal, having a first LO frequency, for its operation. In practice, the first transceiver circuit 15 may require more than one LO signal, for example one or more LO signals for a transmitter of the first transceiver circuit 15, and one or more LO signals for a receiver of the first transceiver circuit 15. In addition, in FIG. 2, the radio transceiver 10 comprises a second transceiver circuit 20 for the second RAT requiring (at least) a second LO signal having a second LO frequency, which is higher than the first LO frequency. As for the first transceiver circuit 15, the second transceiver circuit 20 may, in practice, require more than one LO signal, for example one or more LO signals for a transmitter of the second transceiver circuit 20, and one or more LO signals for a receiver of the second transceiver circuit 20.

For illustrative purposes, an antenna 25 and an antenna 30 is shown connected to the first transceiver circuit 15 and the second transceiver circuit 20, respectively. Although the antennas 25 and 30 are illustrated in FIG. 2 as single antennas, multiple antennas may be used as well for one or both of the first transceiver circuit 15 and the second transceiver 20. The antennas may be external to the radio transceiver 10, or may be fully or partly comprised in the radio transceiver 10.

Furthermore, in FIG. 2, the radio transceiver 10 comprises a frequency synthesizer 35 for generation of the first and the second LO signals. The frequency synthesizer has a reference input port 40 for receiving a first reference oscillation signal from a reference oscillator 42. The reference oscillator 42 may e.g. be a crystal oscillator. Furthermore, the reference oscillator 42 may be external to the radio transceiver 10, or may be fully or partly comprised in the radio transceiver 10.

As illustrated in FIG. 2, the frequency synthesizer 35 comprises a first clock-signal generator 45. The first clock signal generator 45 is adapted to generate the first LO signal based on the first reference oscillation signal. In FIG. 2, the first clock signal generator 45 has an input port 50 for receiving the first reference oscillation signal, and an output port 55 for outputting the first LO signal to an LO input port 60 of the first transceiver circuit 15.

Furthermore, as illustrated in FIG. 2, the frequency synthesizer 35 comprises a second clock-signal generator 65. The second clock-signal generator 65 is adapted to generate the second LO signal based on a second reference oscillation signal. In FIG. 2, the second clock signal generator 65 has an input port 70 for receiving the second reference oscillation signal, and an output port 75 for outputting the second LO signal to an LO input port 80 of the second transceiver circuit 20.

According to some embodiments of the present invention, the second reference oscillation signal is the first LO signal. This is indicated in FIG. 2 with a connection between the output port 55 of the first clock-signal generator 45 and the input port 70 of the second clock-signal generator 65. The connections from the output port 55 of the first clock signal generator to the LO input port 60 of the first transceiver circuit 15 and to the input port 70 of the second clock signal generator 65 are illustrated in FIG. 2 as direct connections for simplicity. However, in reality the LO input port 60 of the first transceiver circuit 15 and the input port 70 of the second clock signal generator 65 need not necessarily be connected to the same electrical node. For example, buffers may be present in any or both of the paths from the output port 55 of the first clock-signal generator 45 to the LO input port 60 of the first transceiver circuit 15 and to the input port 70 of the second clock-signal generator 65. Thus, physically, the LO input port 60 of the first transceiver circuit 15 and the input port 70 of the second clock signal generator 65 may be connected to different nodes of a clock-distribution network of the first clock-signal generator 45. However, on a higher level of abstraction, the signals received on the LO input port 60 of the first transceiver circuit 15 and the input port 70 of the second clock signal generator 65 under these circumstances are considered herein to be the same signal, even though they may differ slightly in phase and/or amplitude.

According to some embodiments, the second reference oscillation signal is derived from the first LO signal. For example, the second reference oscillation signal may be derived by integer or non-integer (e.g. fractional) frequency division of the first LO signal. Although not explicitly shown in the figures, a frequency divider may be comprised in the frequency synthesizer 35 (e.g. in the second clock-signal generator 65) for this purpose.

Any or both of the first and the second clock-signal generator 45, 65 may be or comprise a PLL for generating the first and second LO signals, respectively. PLLs are, per se, well known in the art of clock-signal generation, and are therefore not further discussed herein.

According to some embodiments, the first LO frequency is in the range 0.5-5 GHz. As indicated above, this frequency range is normally used in cellular communication systems.

As also indicated above, the second transceiver circuit may be adapted to work with a RAT operating in the 60 GHz band (i.e. an unlicensed band in the 60 GHz region). The exact frequency range of this 60 GHz band is different in different regions of the world, but typically lies between 57 and 66 GHz. Thus, according to some embodiments, the second LO frequency is in the 57 to 66 GHz range. The second LO frequency can also be lower, for instance by a factor of 3, resulting in a range of 19 to 22 GHz. The inventors have found that the advantages of using an increased PLL bandwidth for phase noise reductions mentioned above are obtainable also at lower frequencies than that, at least for frequencies down to 10 GHz. Thus, in some embodiments, the second LO frequency is higher than or equal to 10 GHz.

The value of the second LO frequency may, alternatively to the absolute ranges discussed above, instead be defined relative to the first LO frequency. For example, in some embodiments, the second LO frequency is at least a factor 5 higher than the first LO frequency.

As mentioned above, any or both of the first and the second transceiver circuit may require several LO signals for their operation, such as separate LO signals for a transmitter and a receiver. In e.g. cellular RATs, the LO frequency used in a receiver may change more often than the corresponding LO frequency used in a transmitter of the same transceiver circuit, e.g. due to measurements procedures performed by the receiver in various frequency band. Therefore, according to some embodiments, first LO signal is an LO signal for a transmitter of the first transceiver circuit 15, since this can provide a more stable reference frequency for the second clock signal generator 65.

Regardless of whether the first LO signal is an LO signal of a transmitter or a receiver of the first transceiver circuit 15, it still occurs, at least in some embodiments, that the first LO frequency is subject to a change, e.g. due to a change in frequency allocation for the first transceiver circuit 15 in the first RAT. Since the first LO frequency is used as a reference frequency for the second clock-signal generator, proper measures should be taken such that the second LO signal is nevertheless maintained at the (desired) second LO frequency. For this purpose, the radio transceiver 10 may comprise a control unit, shown in FIG. 2 as a control unit 90. The control unit 90 may e.g. be a baseband processor of the radio transceiver 10. According to some embodiments, the control unit 90 is adapted to detect a change of the first LO frequency. For example, the control unit 90 may in some embodiments be responsible for effectuating said change of the first LO frequency, e.g. by adjusting a setting (e.g. a divisor of a frequency divider of the first clock-signal generator 45) of the first clock signal generator 45. In that case, the detection is trivial for the control unit 90, since it is aware of its own actions. In other embodiments, some other unit may be responsible for effectuating said change of the first LO frequency. The control unit 90 may then detect said change by means of receiving a signal from that other unit that the first LO frequency has or is about to be changed, possibly also an indication of what the change is.

According to some embodiments, the control unit 90 is further adapted to, in response to detecting said change of said first LO frequency, adjust a setting of the second clock-signal generator 65 (e.g. a divisor of a frequency divider of the second clock signal generator 65) to maintain the second LO signal at the (desired) second LO frequency.

Even though the control unit 90 takes measure to make sure that the second LO signal is maintained at the (desired) second LO frequency (at least after the first LO frequency has settled at its new value after the change), it is likely that a temporary frequency variation of the second LO signal, due to the change of the first LO frequency (which e.g. will take some time to settle at its new value), distorts or corrupts the signal received by the second transceiver circuit 20 in a time interval around said change. Therefore, in some embodiments, the control unit 90 is adapted to, in response to detecting said change of said first LO frequency, indicate said change to the second transceiver circuit 20. The second transceiver circuit 20 may then take suitable corrective measures. For example, in response to receiving an indication from the control unit 90 that the first LO frequency has changed, the second transceiver circuit 20 may discard a received signal segment (such as one or more frames) affected by said change of the first LO frequency.

An alternative to discarding said received signal segment upon detecting said change of the first LO frequency is, in some embodiments, to have a third clock-signal generator (which e.g. may be or comprise a PLL) that temporarily replaces the first clock signal generator 45 for the generation of the second reference oscillation signal. The third clock signal generator may be started ahead of that change of the first LO frequency, such that it can be switched in to be used for the generation of the second reference oscillation signal at a suitable time instance (e.g. between frames of the second RAT to avoid, or at least limit, detrimental effects of the change of reference source) and switched out again at or after the first LO frequency has stabilized at another suitable time instance (again e.g. between frames of the second RAT to avoid, or at least limit, detrimental effects of the change of reference source). An advantage with using the third clock-signal generator only temporarily during the transients is that it can be powered down most of the time such that less energy is consumed compared to having the third clock-signal generator being used as a reference for the second clock-signal generator 65 permanently.

Figure 3:
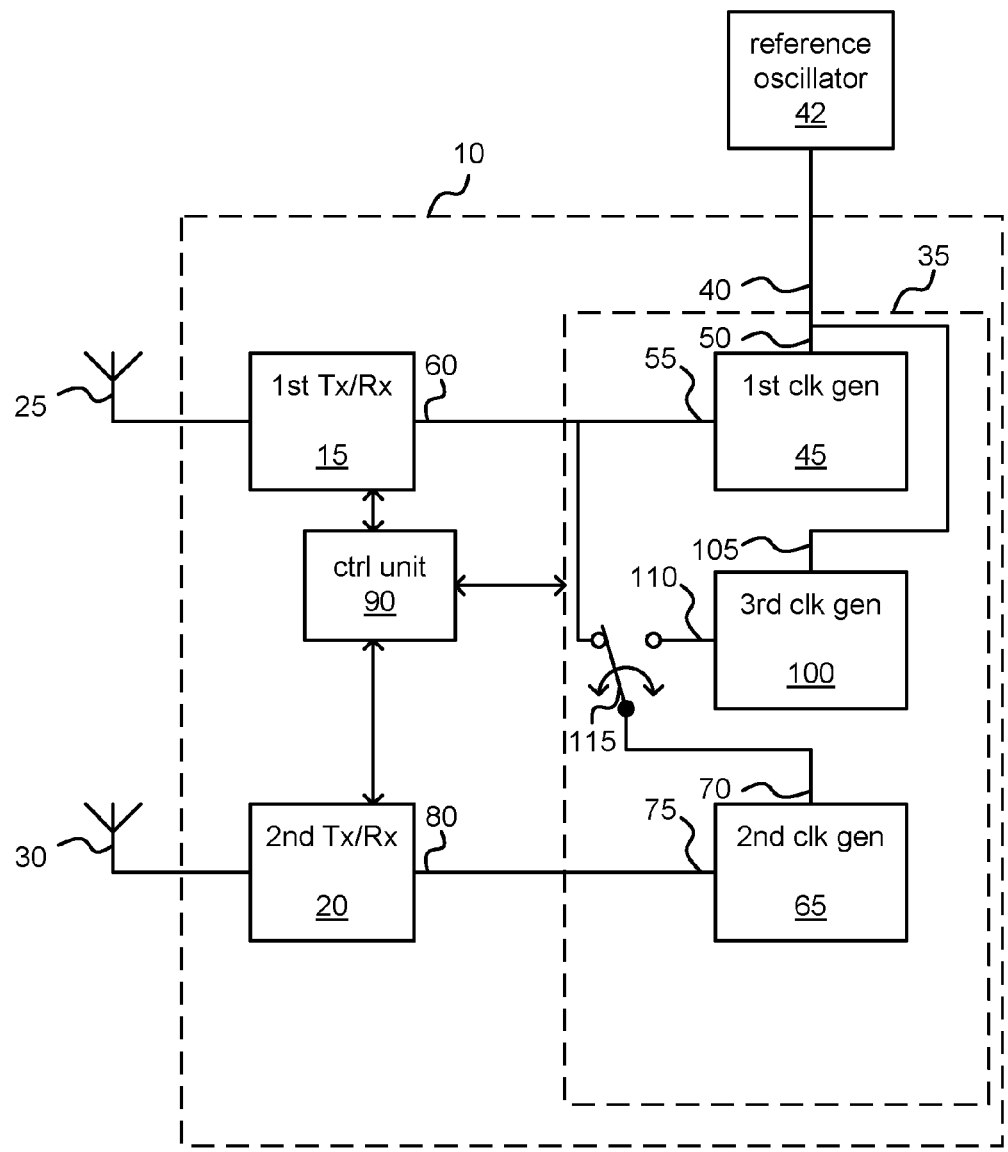

Such an embodiment is illustrated in FIG. 3, wherein the frequency synthesizer 35 comprises such a third clock-signal generator 100 adapted to temporarily generate the second reference oscillation signal during a change of the first LO frequency. As illustrated in FIG. 3, the third clock signal generator may have an input port 105 for receiving the first reference oscillation signal, or possibly some other reference oscillation signal. In the embodiment illustrated in FIG. 3, the third clock signal generator is adapted to generate a third LO signal at an output port 110, which the second clock signal generator 65 can temporarily use as the second reference oscillation signal, or derive the second reference oscillation signal from. For this purpose, the frequency synthesizer may e.g. comprise a switch 115, as indicated in FIG. 3, that can selectively direct either the first or the third LO signal to the input port 70 of the second clock signal generator 65. The switch 115 may e.g. be controlled by the control unit 90.

In order to avoid a frequency transient in the second LO signal, the switch 115 should preferably only be switched when there is a minimal phase difference between the signals from the first clock-signal generator 45 and the third clock signal generator 100. To facilitate this it may be advantageous to put a phase detector comparing the clock signal edges of these two signals, providing an output signal to the control unit 90. It should be noted, however, that since the second clock-signal generator 65 has a high reference frequency, its PLL can be very fast, and the transient will thus be much shorter compared with that of the first clock-signal generator 45, which reduces the impact on the second transceiver-circuit 20.

Another alternative than the use of the third clock-signal generator 100 to reduce detrimental impacts on the second transceiver circuit due to changes of the first LO frequency is to use a model, or estimate, of the transient behavior of the first clock-signal generator when the first LO frequency is changed (such as a model, or estimate, of the settling behavior of the first LO frequency in such situations). The control unit 90 may thus, in some embodiments, have a model of how the first LO frequency changes over time when a frequency change is initiated. This model may be derived off-line and stored in the control unit 90 beforehand, or it may be obtained by measuring the actual frequency change. Measurements may also be used to iteratively update the model stored in the control unit 90. The control unit 90 may be adapted to use this model for compensation of the second clock-signal generator 65. Thereby, the effects of the transient behavior of the first LO signal on the transient behavior of the second LO signal may be minimized, or at least kept relatively low. For example, the control unit 90 may be adapted to, based on the model, continually or repeatedly, adjust a setting (again e.g. a divisor of a frequency divider of the second clock-signal generator 65) of the second clock signal generator 65 during a settling period of the first LO frequency. Said settling period may e.g. be determined based on simulations and/or measurements. The settling period may e.g. be a period of time from the initiation of a change of the first LO frequency to an instant in time when the first LO frequency has settled within a certain tolerance, such as a predetermined or given tolerance.

In examples and embodiments described above, a cellular RAT, such as GSM, WCDMA, or LTE, has been considered as the first RAT. Furthermore, IEEE 802.11ad, WirelessHD WiGig, and ECMA-387 have been used as examples of the second RAT. However, the invention is not limited to these RATs, and embodiments of the present invention may be applicable to other existing or future RATs. For example, to offload a cellular network, it has been suggested that UEs be equipped with the capability of so called direct device-to-device (D2D) communication, where two UEs, if in the proximity of each other, can communicate data directly with each other without sending the data via the cellular network. An example of a second RAT may then be a dedicated RAT for such direct D2D communication, e.g. in the 60 GHz band or some other suitable frequency band.

Furthermore, in the examples and embodiments described above, the first transceiver circuit 15 and the second transceiver circuit 20 has been described as transceiver circuits for different RATs (i.e. the first and the second RAT). However, in other embodiments, the first transceiver circuit 15 and the second transceiver circuit 20 may be transceiver circuits for the same RAT, but operating at different frequencies (i.e. sending/receiving signals in different RF frequency bands). More particularly, in some embodiments, the second transceiver circuit 20 is a transceiver circuit for the same RAT as the first transceiver circuit 15, but operating at higher frequencies than the first transceiver circuit 15. Thus, the first transceiver circuit 15 may be a transceiver circuit for a first RAT in a first frequency band (e.g. in the region 0.5-5 GHz), and the second transceiver circuit 20 may be a transceiver circuit for the same first RAT in a second frequency band located higher in frequency than the first frequency band (e.g. around 60 GHz). As a nonlimiting example, LTE might be used in higher frequency bands than the aforementioned 0.5-5 GHz typically used for cellular communication, such as but not limited to in the 60 GHz band. Thus, the first transceiver circuit 15 may be a transceiver circuit for LTE in the first frequency band (e.g. in the region 0.5-5 GHz), and the second transceiver circuit 20 may be a transceiver circuit for LTE in the second frequency band (e.g. around 60 GHz). Said first RAT (such as but not limited to LTE) may e.g. be used for direct D2D communication in the second frequency band.

Furthermore, a UE for a cellular communication system (e.g. UE 1, FIG. 1) has been used above as an example of a radio communication apparatus comprising the radio transceiver 10 according to embodiments of the present invention. A UE in this context may e.g. be a mobile phone, a cellular data modem, or a personal computer or other equipment comprising such a cellular data modem. However, this is only an example. Other radio communication apparatuses may also comprise the radio transceiver 10 according to embodiments of the present invention.

The present invention has been described above with reference to specific embodiments. However, other embodiments than the above described are possible within the scope of the invention. The different features of the embodiments may be combined in other combinations than those described. The scope of the invention is only limited by the appended patent claims.

The invention claimed is:

1. A radio transceiver comprising:
   a first transceiver circuit, requiring a first local oscillator (LO) signal, having a first LO frequency;
   a second transceiver circuit requiring a second LO signal having a second LO frequency, which is higher than the first LO frequency; and
   a frequency synthesizer comprising:
   a reference input port for receiving a first reference oscillation signal from a reference oscillator;
   a first clock-signal generator adapted to generate the first LO signal based on the first reference oscillation signal; and
   a second clock-signal generator adapted to generate the second LO signal based on a second reference oscillation signal, which is or is derived from the first LO signal,
   wherein both of the first and the second clock-signal generators are a phase-locked loop (PLL) or comprise a PLL.

2. The radio transceiver according to claim 1, wherein the first LO frequency is in the range 0.5-5 GHz.

3. The radio transceiver according to claim 1, wherein the second LO frequency is higher than or equal to 10 GHz.

4. The radio transceiver according to claim 1, wherein the second LO frequency is at least a factor 5 higher than the first LO frequency.

5. The radio transceiver according to claim 1, wherein the first LO signal is an LO signal for a transmitter of the first transceiver circuit.

6. The radio transceiver according to claim 1, comprising a control unit adapted to detect a change of the first LO frequency.

7. The radio transceiver according to claim 6, wherein the control unit is adapted to, in response to detecting said change of said first LO frequency, adjust a setting of the second clock-signal generator to maintain the second LO signal at the second LO frequency.

8. The radio transceiver according to claim 6, wherein the control unit is adapted to, in response to detecting said change of said first LO frequency, indicate said change to the second transceiver circuit.

9. The radio transceiver according to claim 8, wherein the second transceiver circuit is adapted to, in response to receiving an indication from the control unit that the first LO frequency has changed, discard a received signal segment affected by said change of the first LO frequency.

10. The radio transceiver according to claim 1, wherein the frequency synthesizer comprises a third clock-signal generator adapted to temporarily generate the second reference oscillation signal during a change of the first LO frequency.

11. The radio transceiver according to claim 1, wherein the first transceiver circuit is a transceiver circuit for a first Radio Access Technology (RAT).

12. The radio transceiver according to claim 11, wherein the first RAT is a cellular RAT.

13. The radio transceiver according to claim 12, wherein the cellular RAT is a Global System for Mobile Communications (GSM), a Wideband Code-Division Multiple Access (WCDMA), or a Long Term Evolution (LTE) RAT.

14. The radio transceiver according to claim 11, wherein the second transceiver circuit is also a transceiver for the first RAT, but operating at higher frequencies than the first transceiver circuit.

15. The radio transceiver according to claim 11, wherein the second transceiver circuit is a transceiver circuit for a second RAT.

16. The radio transceiver according to claim 15, wherein the second RAT is IEEE 802.11ad, WirelessHD, WiGig, ECMA-387, or a direct device-to-device RAT.

17. A radio communication apparatus comprising the radio transceiver according to claim 1.

18. The radio communication apparatus according to claim 17, wherein the radio communication apparatus is a user equipment for a cellular communication system.

* * * * *